United States Patent [19]

Dow

[11] 4,171,730

[45] Oct. 23, 1979

[54] ELECTRIC MOTOR VEHICLE

[76] Inventor: Douglas Dow, 1052 Seminole, Detroit, Mich. 48214

[21] Appl. No.: 766,534

[22] Filed: Feb. 7, 1977

[51] Int. Cl.² .............................................. B62D 61/08
[52] U.S. Cl. ................................ 180/210; 180/65 R; 280/716; 293/136; 296/35 B
[58] Field of Search ...................... 293/63, 89; 267/11, 267/36, 140, 141; 296/35 B, 65 A; 180/25 R, 65 R; 280/716

[56] References Cited

U.S. PATENT DOCUMENTS

| | | | |
|---|---|---|---|
| 1,313,429 | 8/1919 | Lenfestey | 180/64 R |
| 2,144,357 | 1/1939 | Booharin | 293/89 X |
| 2,822,055 | 2/1958 | Ludowici | 180/1 R |
| 2,857,010 | 10/1958 | Leroy | 180/59 |
| 2,900,036 | 8/1959 | Blake | 180/82 R |
| 2,959,446 | 11/1960 | Thompson | 296/65 R |
| 2,971,771 | 2/1961 | Jewell | 280/687 |
| 3,380,557 | 4/1968 | Peterson | 188/1 |
| 3,476,434 | 11/1969 | Coyle | 296/35 R |
| 3,589,744 | 6/1971 | Hansen | 180/25 R X |
| 3,614,084 | 10/1971 | Brown | 267/153 |
| 3,640,545 | 2/1972 | Citroen | 280/716 |
| 3,656,792 | 4/1972 | Tavaho, Sr. | 293/85 |
| 3,718,356 | 2/1973 | Gabella | 293/89 X |
| 3,927,730 | 12/1975 | Winslow | 296/35 B X |
| 3,939,721 | 6/1960 | Smith et al. | 280/106.5 R |

FOREIGN PATENT DOCUMENTS 767675 3/1953 Fed. Rep. of Germany .
646443 11/1928 France .
911898 7/1946 France .
486968 6/1938 United Kingdom .

OTHER PUBLICATIONS

Car and Driver, "Road Test-1966-427 Cobra", Nov. 1965.
Rubber Springs for Automotive Equipment, J. E. Hale of Firestone Tire, Akron, Ohio, at May 13, 1946 Meeting of SAE.
Fenner Aero Rings and Cord, Fenner America Ltd.

Primary Examiner—Richard A. Bertsch
Assistant Examiner—Michael Mar
Attorney, Agent, or Firm—Burton, Parker & Schramm

[57] ABSTRACT

Relates to a lightweight electric battery powered motor vehicle which is divisible into separable front, middle and rear sections. The front section includes a pair of steerable road engaging wheels, the middle section includes a seating compartment for two or three persons, and the rear section includes a single road engaging drive wheel driven by an electric motor. The basic supporting structure of the vehicle is served by a double set of longitudinally extending main frame members each preferably of tubular cross-section and extending through the middle section and into the front and rear sections of the vehicle. The hollow interiors of the tubular frame members are substantially filled with resiliently compressible and deformable balls which are compressibly engagable with one another when external forces are applied against either bumper in the direction of the vehicle and transferred to the balls by the push rods associated with each bumper.

37 Claims, 14 Drawing Figures

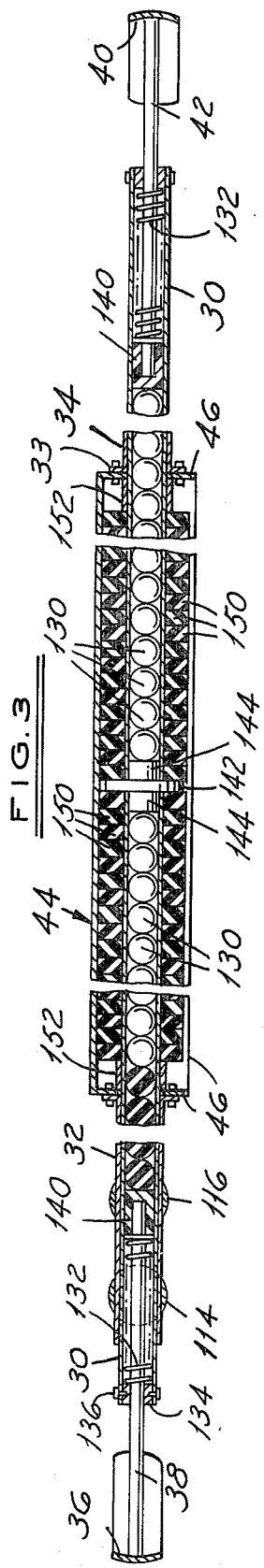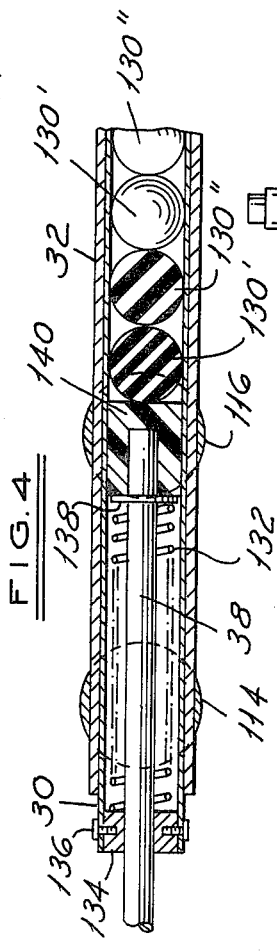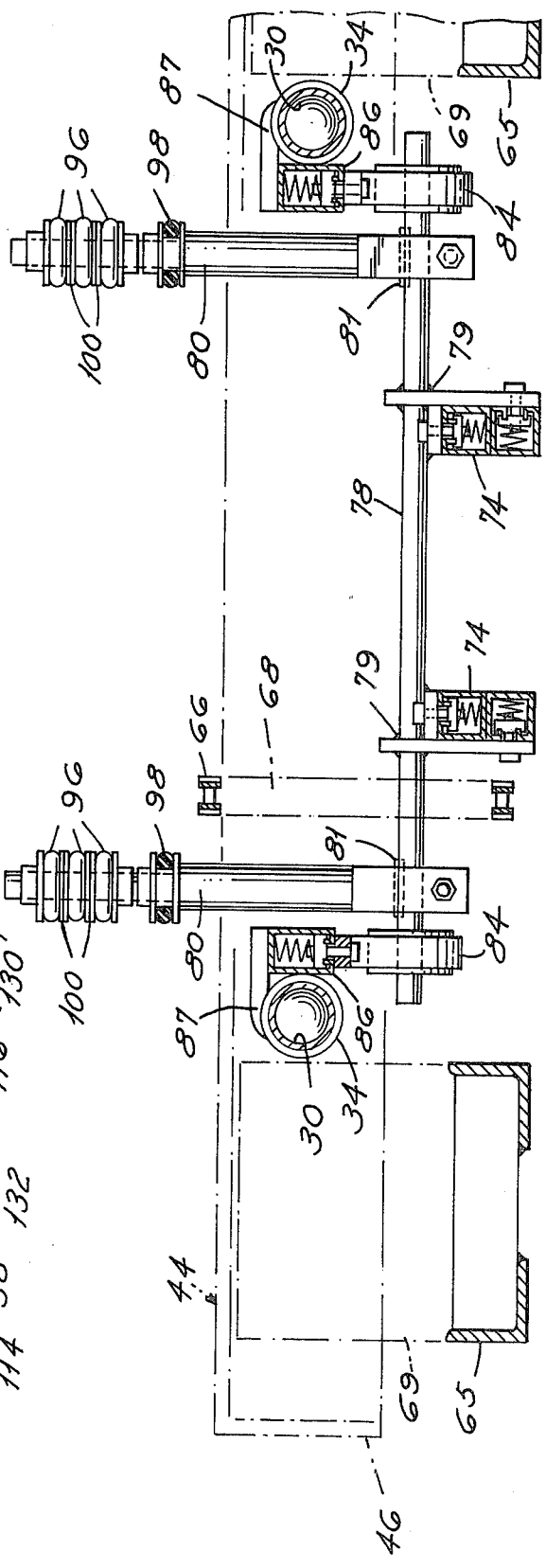

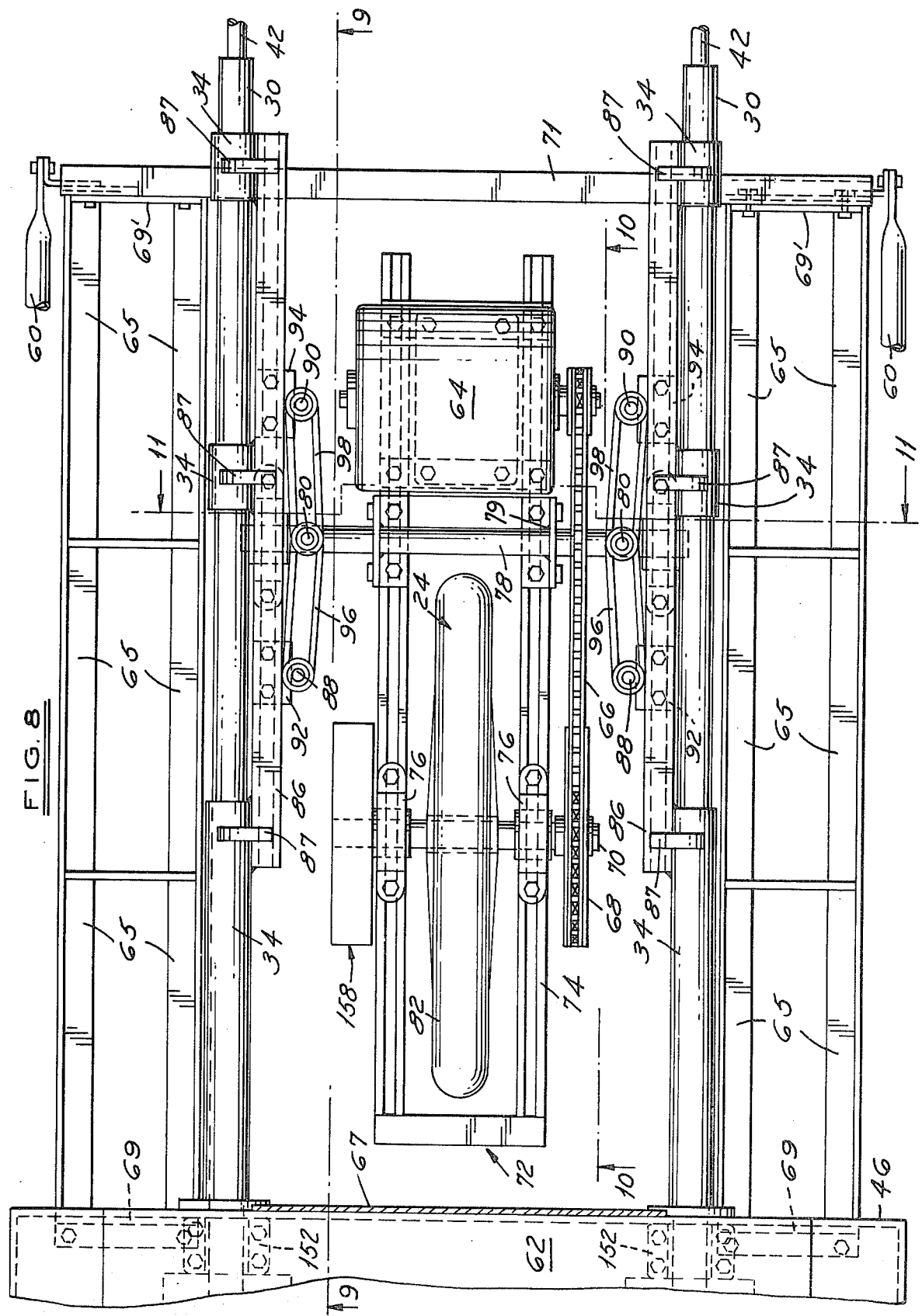

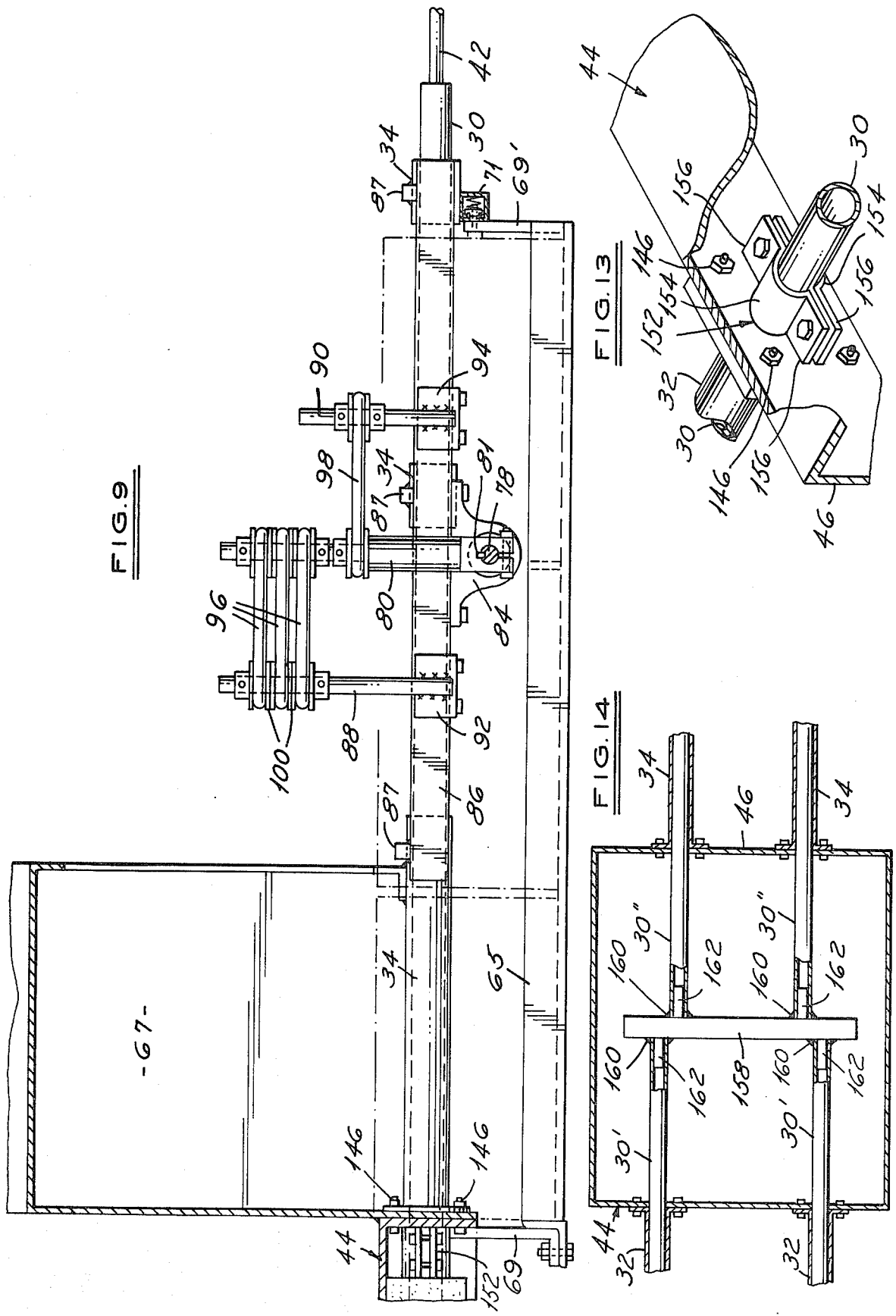

ELECTRIC MOTOR VEHICLE

BACKGROUND OF THE INVENTION

This invention relates to motor vehicles and more particularly to a battery-electric powered motor vehicle.

Many workers in the field of electrically operated motor vehicles have labored long and hard in developing a road vehicle of this character which would successfully overcome many of the problems inherent in such a machine. One major problem has been the development of an electric power source carried by the vehicle sufficient to realize the long term performance goals of this type of vehicle, such as a range of 200 miles per battery charge at a top speed of 70 mph. Other problems, related to that of the battery, have been and still are the reduction of the over-all weight of the vehicle, the vehicle's wind resistance, the rolling drag of the vehicle, and certain safety provisions necessitated by the desired lightweight structure of the vehicle.

Currently, the United States is experiencing an energy crisis of truly global proportions. This technologically advanced society is dependent on petroleum fuels to a much larger extent than can be fulfilled by its own petroleum natural resources. The population of the United States has, of necessity, become dependent on other countries for its supply of these fuels. In order not to jeopardize its economy and national security, it is imperative that the United States achieve independence from foreign petroleum fuel sources and do it as quickly as possible.

Currently, internal combustion passenger automobiles consume in excess of four million barrels of oil per day. According to a 1975 study (SAE 750004, February 1975 by Thomas C. Austin and Karl H. Hellman of the Environmental Protection Agency) on car fuel economy as influenced by trip length, approximately one third of all automobile travel in the United States is seen to consist of trips of no more than ten miles in length. Because short trips involve more frequent stops and a smaller percentage of operation during warmed up conditions nearly half of the fuel (approximately two million barrels per day) is used by automobiles during the execution of these short trips.

The United States now faces particularly critical energy problems. Its Federal Government has addressed itself to these problems by establishing national fuel independence as a top priority objective. To this end, short and long range goals have been established including the conservation and maximization of existing fuel reserves not only by means of more efficient use of these fuels but the eventual substitution of alternative fuel sources for petroleum fuels. For motor vehicles, electrical energy offers a practical substitute in situations traditionally employing petroleum fuels.

SUMMARY OF INVENTION

If the hereinafter defined concept of "limited performance" is accepted, it is urged as evidenced by this invention that a low cost, lightweight, safe and very efficient electric powered vehicle can be built now, using today's lead acid batteries. By "limited performance" is meant a two or three passenger vehicle with a top speed of 40 to 45 mph and a range of 40 to 60 miles per charge. Of course, if battery research develops a more powerful, longer lasting, lightweight battery, a vehicle so powered can still employ the features of the limited performance car in order to maximize its efficiency, speed, safety and distance of travel between charges. The additional transfer to electrical power would further save in the use of petroleum fuels for vehicle propulsion.

Accordingly, an important object of the invention is to provide a low cost, lightweight, safe and highly efficient electric powered vehicle.

Another important object of the invention is to provide a commercially viable vehicle using today's state of the art that can contribute immediately to the nation's need for energy conservation in a substantial portion of the transportation spectrum.

Another important object of the invention is to provide improved means for protecting the passengers in lightweight automobiles by means which absorbs collision kinetic energy while controlling the deceleration of the passenger compartment.

Another important object of the invention is to provide an improved readily adjustable suspension system for the vehicle wheels which utilizes elastomers in tension in order to provide a soft ride with energy efficient low rolling resistance hard tires.

Another important object of the invention is to provide an integrated design of a basic vehicle suitable to accept the drive system disclosed in my earlier U.S. Pat. No. 3,190,387 incorporating the feature of regenerative braking by means of a separately excited field. That is to say, the feature uses the electric motor as a generator by converting the kinetic energy of the vehicle into electrical energy whenever the vehicle slows down or goes down a hill. In order to take full advantage of the regenerative braking feature of that patented design, the new vehicle incorporates improvements in frame, suspension, wheels, tires and drive train. In order to be commercially viable with today's lead acid batteries the new vehicle design incorporates the limited performance conception of carrying two or three passengers, limited top speed and range, lightweight structure and three-wheel support configuration.

In order to increase the safety feature of the lightweight vehicle when subject to standard traffic "mix" conditions, the tubular frame and energy absorbing safety features incorporated in the bumper system and slidable passenger compartment are included in the integrated vehicle designs. Special provisions are made in the herein disclosed design of vehicle to protect the driver and passengers by absorbing the kinetic energy resulting from a collision and by providing controlled deceleration of the occupant compartment of the vehicle. Additional stability is obtained for an electric three-wheel vehicle because of the potential of placing the heavy batteries in a location ideal with respect to the vehicle's center of gravity.

Weight is a major feature in energy and power requirements of all motor vehicles both for level steady state running and for gradability and acceleration. For an electric motor vehicle with today's lead acid batteries, it is even more important. If from one-third to one-half of the vehicle weight must be assigned to batteries to obtain an acceptable range for each charging of the batteries, then for every pound saved on the chassis, from one-half pound to a full additional pound is saved in battery weight.

It is also apparent from the drawing Figures that the herein disclosed vehicle has three road engaging wheels, two front steerable wheels and one rear driving wheel. The reasons for choosing a three-wheel configuration are weight, economy and energy efficiency. The heavy weight of the vehicle's battery source makes it imperative to reduce the total over-all weight of the vehicle to achieve the maximum performance or range, and this three-wheel configuration allows for the elimination of the total weight of one wheel, its suspension system, brake drum and differential. The three-wheel configuration not only saves the weight and expense of the above-mentioned items, but it also permits a highly efficient simple drive train, such as the illustrated roller chain, or timing belt, or a direct single reduction gear drive, for rotating the drive wheel.

BRIEF DESCRIPTION OF THE DRAWINGS

Various other objects, advantages and meritorious features will become more fully apparent from the following specification, appended claims and accompanying drawing figures, wherein

FIG. 3 is a longitudinal sectional view taken along line 3—3 of FIG. 2 and showing the hollow interior of one of the main frame members for the full length thereof and further showing the resilient balls in the interior thereof and energy absorbing pads mounted externally of the frame members;

FIG. 4 is an enlarged sectional view of a part of the assembly illustrated in FIG. 3 and showing in greater detail the mounting arrangement of the bumper push rod assembly for compressing the resilient balls;

FIG. 8 is a top plan view of the rear section of the vehicle taken along line 8—8 of FIG. 1 showing the disposition of the parts of the rear sub-frame including the rocking unit composed of the single drive wheel and the motor for driving the same;

FIG. 9 is a vertical sectional view of the rear section of the vehicle taken along line 9—9 of FIG. 8 and showing a side elevation of the spring suspension system for the vehicle propelling unit;

FIG. 11 is a vertical cross-sectional view of the vehicle's rear section taken on line 11—11 of FIG. 8;

FIG. 13 is a detail perspective view of a platform holding clamp in mounted position; and FIG. 14 is an underside plan view of the platform for the occupant compartment showing a modification of the tubular main frame assembly.

DESCRIPTION OF A PREFERRED EMBODIMENT

The accompanying Figures illustrate the underlying framework and operating devices of the electric vehicle but obviously lack the protective cover or shell over the chassis and the occupant compartment which is designed to comfortably seat two or three persons. It is to be understood that a streamlined body will overlie the basis framework and operating devices of the vehicle especially since a streamlined exterior will substantially reduce the wind resistance and aerodynamic drag of the vehicle.

Figure 1:
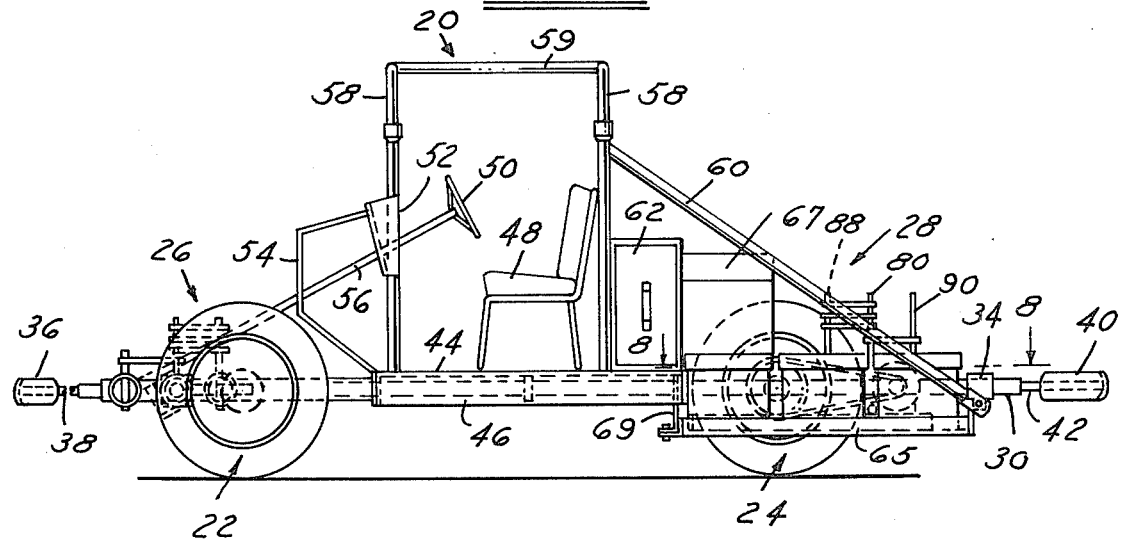
FIG. 1 is a side elevation of an electric motor vehicle constructed in accordance with this invention but without the covering shell normally overlying the chassis and frame of the vehicle.
Figure 2:
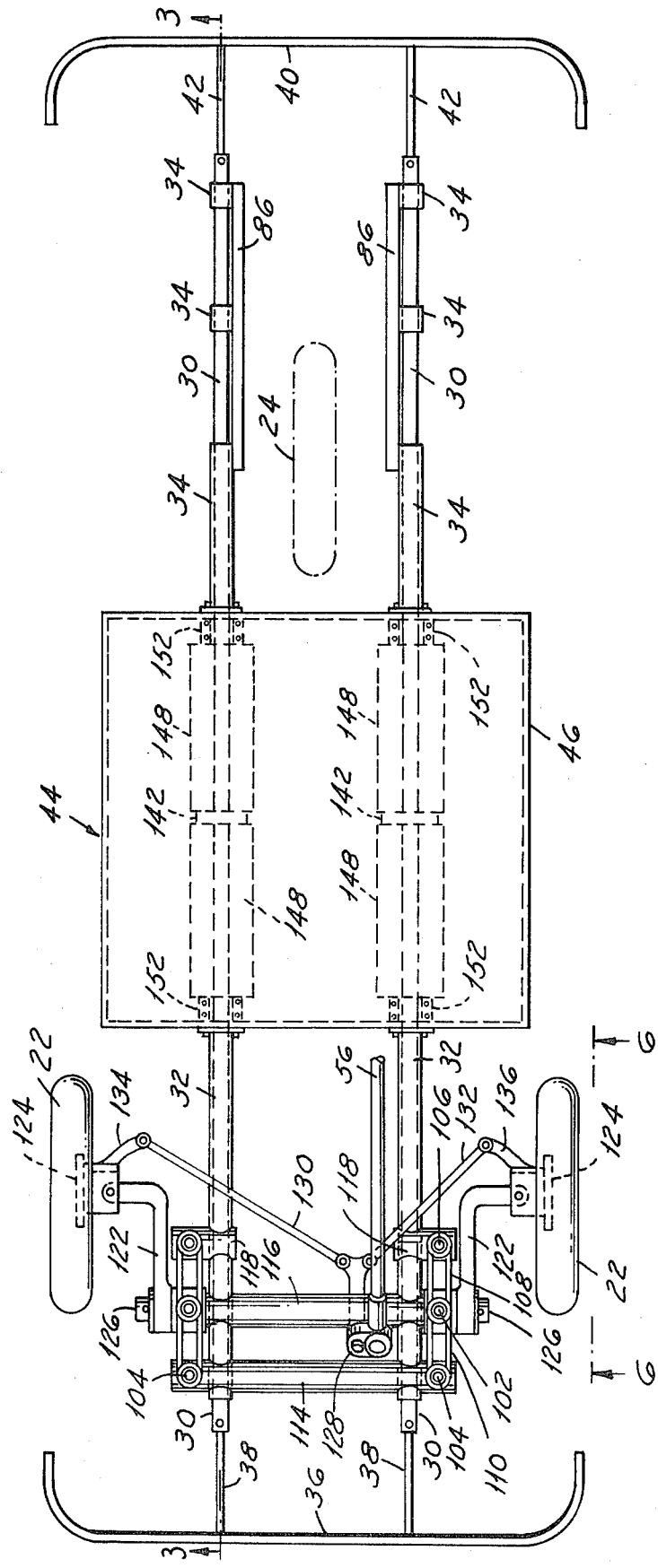
FIG. 2 is a plan view of the chassis of the vehicle illustrated in FIG. 1 and particularly showing the suspension system associated with the front wheels and the tubular frame members extending aft to the rear bumper.

With more specific reference to the drawing Figures, a general description of the vehicle will be first presented followed by specific descriptions of the details of certain improvements included therein. Referring first to FIG. 1, it is apparent that the driver and passenger compartment of the vehicle, generally indicated at 20, is located centrally of the vehicle spaced rearwardly of the front pair of steerable wheels 22—22 and forwardly of the single drive wheel 24. As will become more apparent thereinafter, the illustrated vehicle is actually divisible into three primary sections, the already mentioned central passenger compartment section 20, the front section 26 containing the pair of front steerable wheels, and the rear section 28 containing the propulsion assembly. The basic supporting structure of the vehicle comprises a pair of longitudinally extending laterally spaced apart main frame members indicated at 30—30 as best shown in FIG. 2 each preferably of tubular cross-section and extending for substantially the length of the vehicle. Telescopingly interfitting with the front end portions of these tubular members are supporting sleeves 32—32 which carry the suspension systems for the front pair of wheels 22—22. Similarly, as best shown in FIGS. 8 and 9, the remnants 34 of sleeves, which have been cut away wherever possible to reduce weight, telescopingly fit the rear end portions of the two tubular main frame members 30—30 for carrying the suspension system for the propulsion unit including the road engaging driving wheel 24. Because of their slidable fit on the tubular main frame members, the front sleeves 32—32 and rear sleeve portions 34—34 together with their respective assemblies can be conveniently removed and either later attached or replaced with ease. The vehicle may therefore be considered as divisible into three major assembly units, the central occupant section 20, the front steerable wheel section 26 and the rear single driving wheel section 28, all of which are readily separable from one another.

Not only do the tubular frame members 30—30 provide for the removal and attachment of the front and rear sections of the vehicle as separable unitary assemblies, but the frame members also provide energy absorbing means for the front and rear bumpers of the vehicle. Attention is directed to FIGS. 1 and 2 where the front bumper 36 is shown attached by two push rods 38—38 of similar construction which enter the opened front ends of the main frame members and slidably fit therewithin as later described herein. Likewise, the rear bumper 40 has two push rods 42—42 of similar construction which enter the opened rear ends of the frame members 30—30 and have a slidably fit therewithin. As will be described in more detail hereinafter, the push rods 38—38 and 42—42 have a permitted, though resisted, movement longitudinally within the tubular frame members 30—30.

Figure 7:
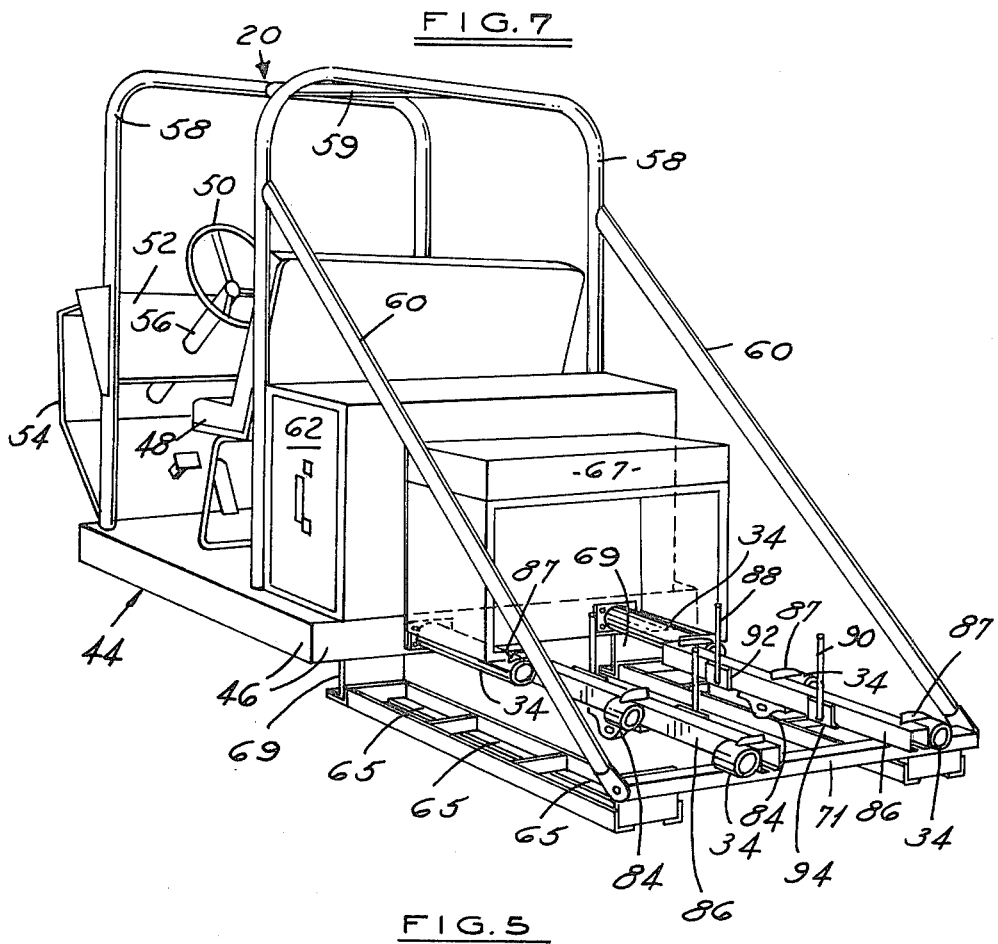
FIG. 7 is a perspective view of the vehicle of FIG. 1 taken from the rear left corner and showing the roll bar frame members and the rear structure but without the tubular main frame members, drive wheel and motor and their supporting sub-frame for purpose of clarity.
Figure 5:
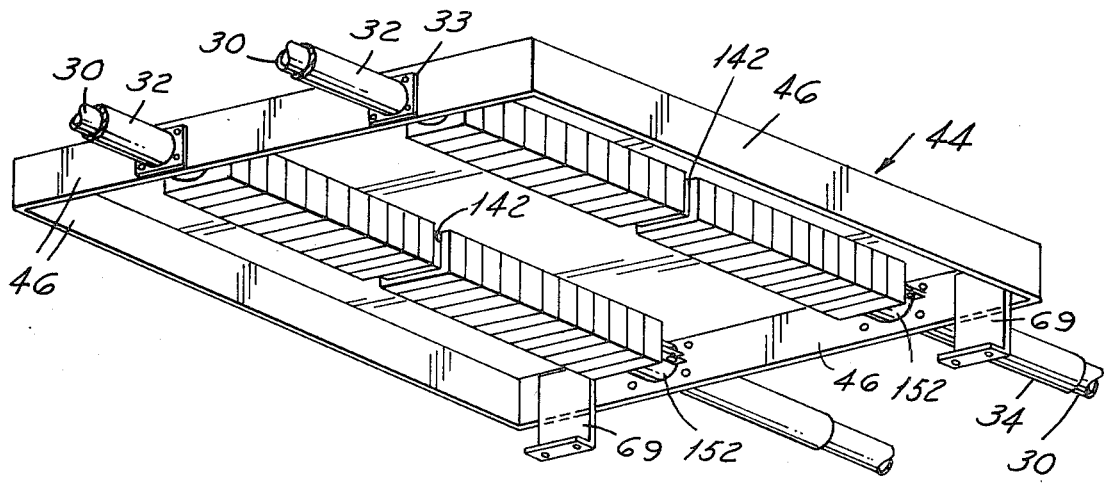
FIG. 5 is an underside perspective view of the base supporting member or platform of the operator and passenger compartment of the vehicle and showing the mounting arrangement of the energy absorbing pads for resisting longitudinal displacement of the compartment relative to the main frame members of the vehicle.

As shown in FIGS. 1 and 5, the centrally located driver and passenger compartment is mounted on a platform 44 of rectangular shape having downwardly depending flanges or skirts 46 on all four sides of the platform. A suitable lightweight material for the platform is a diamond embossed aluminum alloy ¼" thick and 57½" long and 52" wide. Within the passenger compartment is a seat 48 of a size seating two or three persons, a steering wheel 50, an instrument panel 52, and a front panel 54 through which the steering column 56 extends and from which the accelerator and brake pedals protrude as shown in FIG. 7. Two roll bars 58—58 protectingly surround the compartment and are joined by a center bar 59, and inclined bars 60—60 extend upwardly and forwardly from the rear end of the vehicle to stiffen the roll bars in upright position. Space is provided immediately behind the seat 48 for shopping bags. For such purpose, a lockable sliding file-case drawer 62 is shown capable of opening from either side of the vehicle. This will provide storage in closed and locked compartments, the contents of which are not visible unless opened. There is also space under the seat 48 for parcel storage of the nature of a large golf bag or the like.

Propulsion Unit

Figure 10:
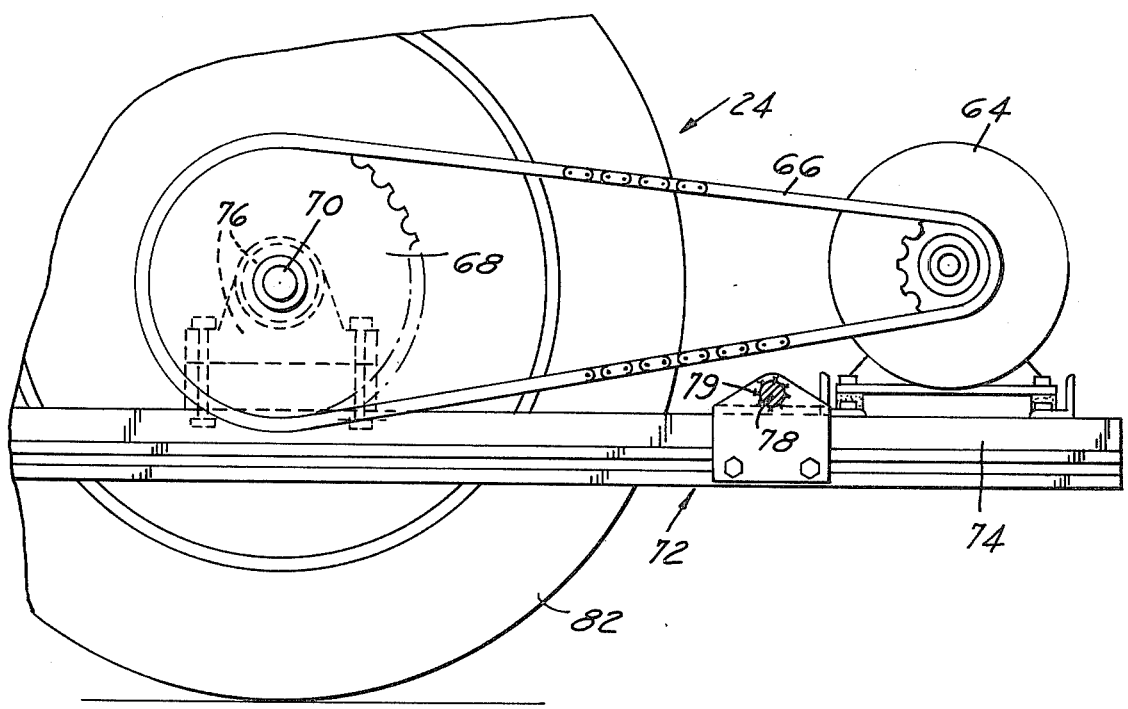
FIG. 10 is a vertical sectional view taken along line 10—10 of FIG. 8 and showing a side elevation of the vehicle propelling unit including the drive wheel and driving motor.
Figure 12:
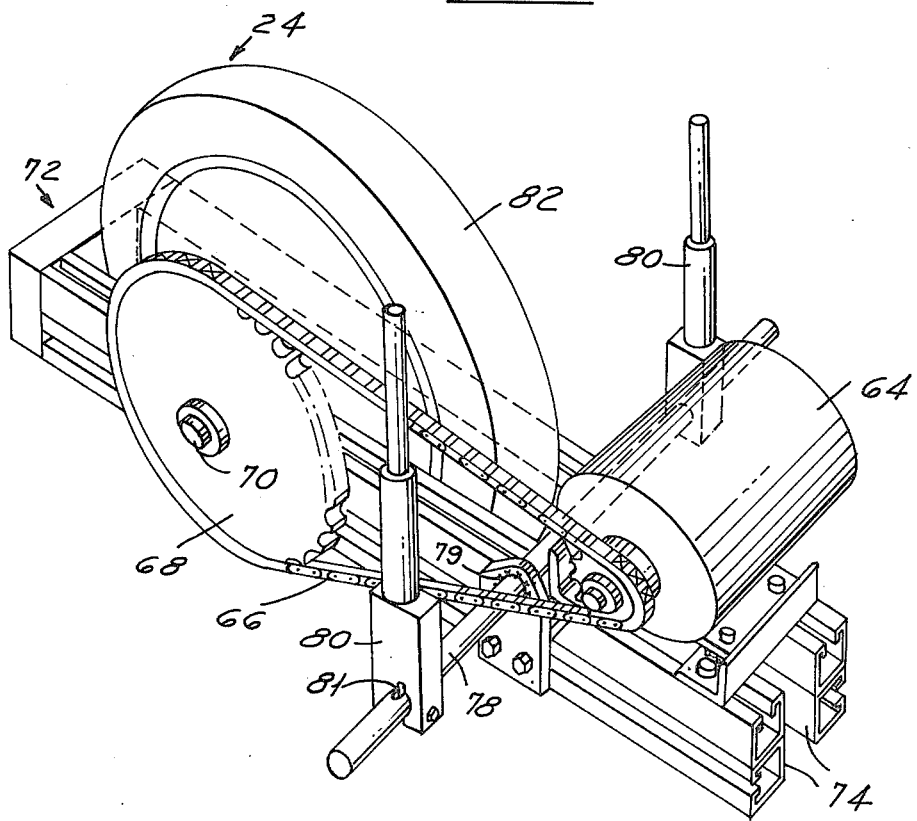
FIG. 12 is a perspective view of the vehicle propelling unit showing the mounting relationship of the drive wheel and motor therefor and the pivotal axis about which the unit rocks.

FIGS. 10 and 12 illustrate the electric propulsion unit of the vehicle located centrally in the rear section 28 thereof and including the earlier mentioned single road engaging drive wheel 24. The vehicle drive wheel 24 is driven by an electric motor 64 which is coupled to the wheel through an endless roller-type drive chain 66, sprocket wheel 68 and live axle 70. This group of operating parts forms a unitary assembly by virtue of being mounted on a sub-frame generally indicated at 72 comprising two "Unistrut" double channel side rails 74—74 secured together in slightly spaced parallel relationship so that the drive wheel 24 may be supported for rotation therebetween as shown by suitable journal blocks 76 in FIGS. 8 and 10. The electric motor 64 is bolted or otherwise rigidly secured to the top of the two "Unistrut" double channel side rails 74—74 in the manner shown in FIGS. 10 and 12. "Unistrut" channels and fittings are made and distributed by the Unistrut Corporation of Wayne, Michigan, and samples of their products are described and illustrated in their general engineering catalogs, such as no. 6A. The sub-frame formed by the "Unistrut" channel side rails 74—74 is pivoted for rocking movement by means of a rocking shaft 78 extending transversely of the vehicle and between the electric motor 64 and the vehicle drive wheel 24. The pivot or rocking shaft 78 is rigidly connected to the channel side rail sub-frame 74—74 for joint rocking movement therewith, such as shown by welding 79 in FIG. 11, and carried on the shaft near each outer end thereof is an upright rod or post 80 keyed as at 81 to the shaft for joint rocking movement therewith. The two posts 80—80 are similar in construction and each serves as a part of the shock absorbing suspension system to be described hereinafter for supporting the rear-end weight of the vehicle on the driving wheel 24 and for permitting the rear end of the vehicle to resiliently yield to the bumps and irregularities encountered in the roadway.

The electric motor 64 of the vehicle propulsion unit is operatively connected to an appropriate source of electrical energy but preferably to an assembly of batteries carried by the vehicle and particularly supported by racks 65 located along both sides of the rear end section 28 of the vehicle. The racks are shown devoid of the batteries for purpose of clarity, but it is to be understood that normally such racks would be loaded with batteries which are connected by electrically conducting cables, some of which are directly connected to the motor and others of which are first connected to control circuits housed in a cabinet 67 located immediately behind of the file-case drawer 62. For suitable weight distribution, the battery racks 65 are preferably positioned on a level below the vehicle main frame members 30—30 and with their longer axis extending in line parallel to the main frame members. To this end, hangers 69 and 69' are provided for suspending the opposite ends of the left hand and right hand series of racks 65 respectively from higher supports in the vehicle, such as the skirt 46 of the passenger compartment platform 44 for the front hangers 69—69 and the vehicle's rear supporting cross frame member 71 for the back hangers 69'—69'. Reference may be had to may aforesaid U.S. Pat. No. 3,190,387 for an understanding of a preferred type of electric drive circuit and electric motor for coupling the electrical energy source carried by the vehicle with the electric motor for rotating a driving wheel in opposite directions and under various speed conditions.

The vehicle propulsion unit as shown in FIG. 10 is mounted centrally within the rear section 28 of the vehicle so that its long dimension extends in the fore and aft direction of the vehicle with the result that the two tubular main frame members 30—30 straddle the single, centrally located, drive wheel 24 and associated motor 64 and other operating parts. In the front section 26 of the vehicle, the forward portions of the tubular frame members 30—30 lie between the pair of front steerable wheels as is evident in FIG. 2. The result is that the front sections of the main frame members 30—30 lie between the pair of front steerable wheels and extend forwardly thereof to carry the front bumper 36 and that the rear sections of the main frame members closely straddle the single drive wheel 24 and extend rearwardly thereof to carry the back bumper 40 as illustrated in FIG. 2.

Shock Cord Suspension Systems

The suspension systems to be described between the front wheels 22—22 and the main frame members 30—30 and between the rear driving wheel 24 and the main frame members provide the desired "ride" characteristics instead of relying heavily on the conventional practice of employing the flexibility in the tires for this purpose with the consequent loss of energy in the hysteresis of the rubber in the tires. Accordingly, tires 82 which are either solid or high pressure low rolling resistance type may be used and still give a comfortable safe ride. The improved shock absorbing suspension systems of the presently described vehicle are based upon the use of elastomers in tension and take the form of "shock rings" or endless bands of resiliently stretchable material which heretofore had occasionally been used in aircraft landing gear.

Four elastomeric systems are employed in the illustrated embodiment of the invention, one such system associated with each of the two front wheels 22—22 and two which are paired together for joint operation with the single vehicle driving wheel 24. The first to be described are the two systems associated with the single drive wheel and located one on each side of the generally indicated sub-frame 72 upon which the drive wheel and motor are mounted. With reference to FIGS. 9-12, each such suspension system associated with the driving wheel 24 includes three upright rods or posts arranged in a row in the fore and aft direction of the vehicle. The middle ones of the three posts of the two suspensions systems have been briefly mentioned; they are the two posts 80—80 which are keyed to the opposite end sections of the rocking shaft 78 and rock in unison with the rocking motions of the sub-frame 72. The opposite extremities of the rocking shaft 78 are journaled in similarly shaped pillow blocks 84—84 enclosing the extremities of the rocking shaft 78 as shown in FIGS. 9 and 11. Each pillow block is bolted or otherwise secured to the underside of a "Unistrut" channel-shaped rail section 86 which extends along side of each main frame member 30 (see FIG. 2) and is welded through gussets 87 (see FIG. 11) to the remnant sleeve portions 34 which removably slidably fit on the main frame member as earlier mentioned herein. The forward post 88 and rearward post 90 of the two elastomeric suspension systems associated with the drive wheel 24 are welded to brackets 92 and 94 respectively which as shown in FIG. 9 adjustably bolt the post to the adjacent "Unistrut" rail section 86.

Carried on the upper ends of the three posts of each elastomeric system are endless bands or shock rings which tend to hold the center post 80 against oscillation about its rocking axis but which can be stretched or elongated with progressively greater resistance to permit the center post to assume an inclination either toward the front or rear end of the vehicle. As best shown in FIG. 9, each suspension system associated with the driving wheel 24 has a set of elastomeric shock rings 96 looped around the upper portions of the posts 80 and 88 and a smaller set, consisting of one shock ring 98 in the illustrated embodiment, similarly looped around the posts 80 and 90. It is to be understood that the number or shock rings may be varied depending on the weight of the vehicle and other factors. The larger set of shock rings 90 carry the entire load of the rear end of the vehicle and also yieldingly resists road reaction forces in an upward direction. The single shock ring 98 of each suspension system yieldingly opposes movement of the driving wheel 24 in the downward direction. Preferably, plastic spools 100 on the posts help maintain the desired spacing of the shock rings and will rotate on the posts to accomodate shiftable movement of the rings about the posts. A wide range of adjustments is feasible with such suspension systems. For example, the various heights to which the shock rings may be adjustably mounted, the initial extension of the shock rings may be varied by slidingly adjusting the bases of the outer posts 88 or 90 along the "Unistrut" side rail members to desired positions where they are then bolted to their respective rail members, and of course by varying the number, sizes or materials of which the shock rings are made.

The shock rings can be made of natural or synthetic elastomeric materials, such as natural rubber, and composed of a multiplicity of single strands covered with cotton braid. So constructed, the likelihood of catastrophic failure is very remote because the individual strands begin to fail singly.

Figure 6:
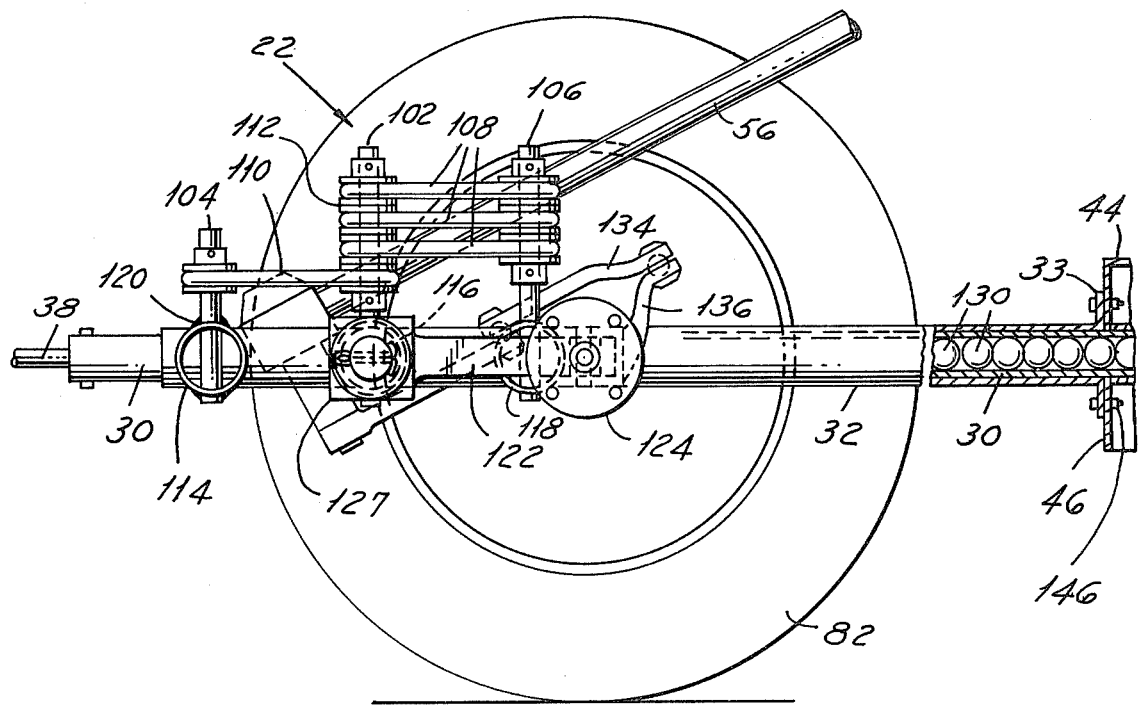
FIG. 6 is a sectional view taken along line 6—6 of FIG. 2 showing the suspension system and steering provision for the front wheel assembly of the vehicle.

The two elastomeric systems for the pair of front wheels 22—22 are similarly constructed but operate to provide independent suspension of each front wheel. Three posts are provided in each such system and arranged in a row extending fore and aft of the vehicle. With reference to FIGS. 2 and 6, the middle posts of the two front suspension systems identified at 102—102 are mounted for oscillatory or rocking motion relative to the two outer posts 104 and 106 which are rigidly held against movement relative to the vehicle frame. As in the case of the rear end suspension system, a larger set of shock rings 108 is provided for interconnecting the post 102 and 106 of each front suspension system in order to carry the weight of the front end of the vehicle. In addition, a single shock ring 110 interconnects the posts 102 and 104 of each front suspension system for yieldingly opposing downward motion of the front wheels 22—22 relative to the vehicle frame. Like the rear suspension system, spools 112 may be provided on each post to help space the shock rings from one another and to accommodate shiftable movement of the rings around the posts.

To enable the front wheels and their respective suspension systems to be removed from and installed as a unit on the vehicle with little difficulty, the two sleeve members 32—32 are designed to telescopingly fit over the front end sections of the frame members 30—30, as earlier mentioned, and to serve as supports for the suspension systems associated with the front pair of wheels 22—22. In addition, two transverse members 114 and 116 of tubular shape not only cross the space between the two sleeves 32—32 and are connected thereto but project beyond the sleeves as is evident in FIG. 2 to form separate supports for the bases of the two pairs of posts 104—104 and 102—102 respectively. Depending upon the nature of the vehicle's steering mechanism, a third cross member could be extended in line with the posts 106—106 and project in the same manner to form support for these posts. However, the illustrated steering mechanism is such that it will interfere with the presence of a third full cross member and in its stead two short tube sections 118—118 of similar shape are substituted as supports for the two posts 106—106 as shown in FIG. 2. These tube sections 118—118 as well as the transverse tubular members 114 and 116 may be rigidly secured to the sleeves 32—32 as by welding or otherwise as indicated at 120 in FIG. 6. Such form of securement may also be used for rigidly mounting the outer posts 104 and 106 on the tubular member 114 and tube sections 118—118 respectively.

The center shock ring post 102 of each front wheel suspension system of the vehicle is connected to the adjacent road wheel 22 in such a manner as to rock to and fro in fixed relation to the up and down movements of its associated wheel relative to the vehicle main frame members 30—30. For accomplishing such rocking motions, a trailing arm 122 is joined at one end in a conventional manner to the steering knuckle 124 of its associated front road wheel 22 and at the other end to the adjacent extremity of the transverse tubular member 116 for pivotal movement about the latter's longitudinal axis. More specifically, each outer end section of the tubular member 116 is fitted with an outwardly projecting stub shaft 126 upon which both the squared base end 127 of the center post and the adjacent end of the trailing arm 122 are journaled in side-by-side relationship. The confronting portions of these two journaled members are welded or otherwise secured for joint pivotal movement so that rocking movements of each trailing arm 122 are transferred to its associated center post 102 where they are yieldingly opposed by either set of shock rings 108 or 110.

The steering mechanism illustrated herein has been adopted from a standard Volkswagen automobile design such as illustrated and described in the Volkswagen Service Manual for model years 1966, 1967 1968 and 1969 published and distributed by Robert Bentley, Inc. and bearing copyright 1972 by Volkswagen of America, Inc. The lower end of the steering column 56 terminates in a housing 128 containing gearing for converting the rotation of the steering column 56 to appropriate turning movements of the two tie rods 130 and 132 of the steering mechanism and thus applying the appropriate turning movements to the steering arms 134 and 136 of the steering knuckles 124—124 for the front wheels 22—22 of the vehicle.

Frame and Bumper Tubing System

As earlier briefly mentioned herein, the front and rear bumpers 36 and 40 have push rods 38 and 42 entering the opened ends of the tubular main frame members 30—30 which in the illustrated embodiment extend for the full length of the vehicle in parallel spaced apart relationship. Enclosed within the hollow interiors of the main frame members are a plurality of energy absorbing elements normally in uncompressed substantially contiguous relationship with one another. Preferably, these elements are in the form of spherical balls 130 having an external diameter slightly less than the inner diameter of the main frame tubes as shown in FIGS. 3 and 4. Inside of the tubular main frame members 30—30, the bumper push rods 38 and 42 are similarly constructed and assembled. Each rod is provided with a helically coiled spring 132 surrounding the rod and bearing at one end against a cylindrical nylon block 134 fixed by screws 136 to the opened end of the main frame tube 30. At its opposite end the coiled spring 132 bears against an annularly shaped metal disc 138 surrounding the rod and fixed thereto for joint axial movement therewith in the tube 30. The opposite face of the disc abuts a second cylindrical block 140 of nylon which encloses the inner extremity of the push rod and substantially abuts the nearest of the series of energy absorbing balls 130 in the main frame tube 30 into which the push rod extends. Each cylindrical nylon block 140 is fastened securely to the inner end of its push rod and is of such a diameter as to slide freely within the main frame tubing 30.

Each nylon block 140 is lightly pressed by its spring 132 against the nearest one of a series of the rubber balls 130 which may be of varying degrees of elasticity from a very elastic ball to an energy absorbing ball which is capable of compression but only resumes its shape slowly. A desirable mix of such balls is a series in which balls of elastic high bounce type alternate with compressible balls which reform slowly. Such a mix is illustrated in FIG. 4 where two adjacent balls 130' and 130" are shown cross sectionally different, the first one 130' representing a high bounce type of ball whereas its companion ball 130" represents an energy absorbing ball which resumes its spherical shape slowly.

Approximately midway of the length of each main frame member 30 there is provided a "ball stopper" in the form of an imperforate steel sheet or plate inserted cross-wise in each main frame tube 30. This could be done by completely severing each tube 30 at the desired location following which the steel sheet is interposed between the cut edges of the same tube and welded thereto to rejoin the severed sections of the tube in alignment with one another. Such an inserted sheet is illustrated at 142 in FIG. 3. To provide a suitable mount for rejoining the severed ends of the two tubular main frame members 30—30, it is preferred that the opposite sides of the "ball stopper" 142 be provided with short co-axially aligned cylindrical projections 144—144 of metallic material which are shaped to slidably fit into the cut ends of the frame members 30—30 in the manner illustrated in FIG. 3 and be welded thereto. Also, it should be noted that, as shown in FIGS. 2 and 3, the inserted sheet 142 is dimensionally greater than the diameter of each main frame tube 30 in which it is mounted so that it projects vertically and horizontally beyond the external surface of the tube to perform another function to be described hereinafter.

It is apparent from the immediately previous description that if either bumper 36 or 40 suffers any more than a light force applied against the bumper in the direction of the center of the vehicle, it will act through its two push rods 38—38 or 42—42 to apply these forces on the two series of resilient balls 130 on its side of the "ball stopper" 142 compressing the balls thereagainst and against one another. Each ball, as it is compressed in this manner, increases its resistance to compression the more its volume is reduced by such pressures. The same applies collectively to all of the balls in each such series. Thus, each elastomeric ball system is of such a nature that the resistance of the balls to compression is nonlinear and in this case provides a resistance to progressive compression that increases with each increment of deformation thereby providing a variable controlled deceleration of the entire vehicle.

Displaceable Occupant Compartment

The platform 44, which serves as the base of the passenger and driver compartment 20, is supported on the vehicle's main frame members 30—30 for resisted slidable movement in the fore and aft direction of the vehicle. Such movement will cause the seat 48, roll bars 58—58, instrument panel 52, file case drawer 62, and other appurtenances secured either directly or indirectly to the platform to move therewith. However, this resisted movement of the occupant compartment 20 will only take place in the event of a severe collision effecting the front or rear sections of the vehicle and is an added safety feature for the occupants of the vehicle.

To accomplish this safety feature, the platform 44 is mounted on the pair of tubular main frame members 30—30 so that the latter extend through the front and rear depending flanges or skirts 46—46 of the platform preferably as shown in FIG. 3 about midway of the height of the skirts. The sleeves 32 and 34, which sheath the front and rear sections of the tubular main frame members 30—30, terminate at the skirts of the platform 44 and are suitably flanged or otherwise shaped at their point of contact with the skirts to form abutting flanges 33 as shown in FIGS. 3 and 6. The flanges 33 are bolted or otherwise secured to the skirts, as shown at 146 in FIGS. 6 and 9, to hold the two together against separation. However, when it is desired to do so, these bolted connections may be unfastened in order to remove the sleeves 32 and 34 from the vehicle along with the front and rear unitary assemblies carried thereby as previously described herein.

Interposed in the spaces between the exterior portions of the "ball stopper" plates 142 and the opposed front and rear skirts 46—46 of the platform 44 are energy absorbing devices generally indicated at 148 which are composed of resilient material (see FIG. 2). Preferably, though not necessarily, each such energy absorbing device 148 is formed of a multiplicity of similarly shaped resilient pads 150 each having a hole therethrough of a size to snugly fit the platform underlying section of the main frame member 30 upon which it is mounted. As shown in FIG. 3, the pads are compactly assembled in rows on the tube members 30—30 and abut the external portions of the "ball stopper" 142 at one end of the row and a clamping device to be described at the other end of the row. The pads 150 are energy absorbing and compressible and will reform slowly to their normal dimensions in the absence of stronger compression forces acting thereon.

Since it would be objectionable for the occupant compartment to shift fore and aft without control at every encountered bump, the presently disclosed vehicle employs certain devices for normally holding the platform from shiftable or sliding movement on the main frame members 30—30, but which will yield to relatively severe collision forces acting on the front or rear sections of the vehicle to allow the platform to slide on the main frame members and absorb some of the energy of the collision impact. Referring particularly to FIG. 13, such devices in the illustrated embodiment are in the form of pipe clamps 152 and preferably of the double U-shaped design composed of two mutually opposed U-shaped elements 154 each of which wraps around about 180° of the clamped member and has lateral extensions or wings 156 at opposite ends of its U-shaped element which are brought into confronting relationship and bolted to one another for causing the U-shaped elements to tightly embrace the clamped member. Such clamping devices are not limited to the U-shaped design; if desired, pipe clamps of the C-shaped design may be used. In either case, four such pipe clamps 152 of the selected design are deployed around the underside of the platform 44 in clamping engagement with the two main frame members 30—30 immediately adjacent to the inside surfaces of the two opposed skirts 46—46 through which the frame members extent. Of the four clamps, the two which are clamped to the main frame members 30—30 immediately adjacent to the front transverse skirt 46 of the platform are indicated by the same reference characters 152—152; the two remaining clamps immediately adjacent to the rear transverse skirt are indicated by the same prime number 152'—152'.

A suitable pipe clamp for this purpose is one made and sold under the trade mark of HYDRA-ZORB. The clamp includes a cushion insert molded of a thermoplastic polymer that combines rubber and plastic properties called HYTREL by DuPont.

In the normal operation of the vehicle, the four pipe clamps 152—152 and 152'—152' would hold the platform from moving in either direction longitudinally of the frame members 30—30. However, the platform is not locked against movement. Rather it is free to move on the main frame tubes 30—30 if the pipe clamps are removed. Should a severe collision with another vehicle or other object occur, one of the two transversely extending skirts 46 of the platform through which the frame members extend will be pressed against the two adjacent clamps, and if sufficient force is applied it will cause them to be resistingly slid along the frame members. Since the other transverse skirt of the platform is moved away from the remaining two clamps, they avoid the pressures encountered by the first two clamps and therefore remain stationary. The result is that once the frictional grip of the two pressured clamps has been overcome, they will slide on the frame members 30—30 permitting the platform to follow them thus absorbing part of the energy resulting from the collision.

If a vehicle constructed in accordance with the illustrated embodiment is involved in a severe crash with resultant impact forces being applied against the front or rear end, the bumper on the affected end of the vehicle will be forced inwardly relative to the main frame members 30—30 causing the balls 130 to be compressed against one another and against the "ball stopper" 142. Depending on the magnitude of the impact forces, the "ball stopper" plate either will remain stationary or yield to the forces and move with the welded sections of the tubular frame member with which it is associated. In the latter case, the portions of the "ball stopper" plate external of the frame tubes will press against the energy absorbing pads 150 in the direction of the impact forces compressing these pads against one another as well as against two of the pipe clamps 152—152 or 152'—152' depending upon which end of the vehicle suffers the collision impact. In a particularly violent crash the frame member tubes 30—30 with the compressible balls 130 therein could be forced inwardly at one end of the vehicle and projected outwardly an equivalent distance from the other end of the vehicle. In so doing, the occupant compartment 20 could ride above the shift in position of the tubular main frame members 30—30 instead of being forced to move therewith.

Since the dimensions of the frame tubes 30—30 are not critical nor are the exact character and dimensions of the energy absorbing devices, these can be readily altered to meet any requirement that develops during collision testing of the vehicle before final decisions are made on production prototypes. The combination of the energy absorbing devices for the bumpers inside the frame tubes and the energy absorbing devices on the outside of the frame tubes for receiving the driving force of the sliding occupant compartment 20 incorporate a substantial lengthwise movement of parts of the vehicle following collision impact. The greater the lengthwise movement the less is the collision force to be absorbed permitting a controlled deceleration of the occupant compartment independently of that of the rest of the vehicle chassis.

Vehicle Braking

As earlier mentioned herein, for braking purposes, reliance is placed in the main on the feature of regenerative braking described in detail in my earlier referenced U.S. Pat. No. 3,190,387. However, for very low speeds, automobile parking, and extreme emergency situations, a suitable conventional brake is provided for the driving wheel 24. This is represented by the rectangular block 158 schematically shown in FIG. 8 associated with the end of the wheel axle 70 opposite to the sprocket wheel 68.

Modification of the Invention

As an alternative for the resilient energy absorbing devices 150, crushable material or other nonresilient or hydraulic energy absorbing devices may be substituted. Such a substitute material might not be self-expandible to its original volume and shape and usually cannot be used again, but it does provide high energy absorbing characteristics for softening severe shocks such as represented by automobile collisions. Although resilient ball-shaped members 310 are preferred, a non-resilient substitute could also replace or supplement the disposition of the balls 130 within the tubular main frame members 30—30. One advantage of the balls 130 is their mobility within the tubes 30—30 enabling them to be conveniently replaced. A small opening of a size to receive the nozzle of a high pressure hose may be made in the tubular frame members immediately adjacent the ball stoppers 142 to blow out the balls from the opposite ends of the tubular members after removal of the bumper push rods therefrom.

In lieu of the pipe clamps 152 for clampingly engaging the two main frame members 30—30 and thereby to prevent slidable movement of the occupant compartment except when the vehicle suffers severe shocks such as a collision impact, a satisfactory substitute is the use of an anaerobic sealant for providing an adhesive securement between the main frame members 30—30 and the bolted flanges 33 and skirts 46 through which frame members 30—30 extend. A suitable sealant of this character is made and distributed under the trademark of "LOCTITE" by the Loctite Corporation of Newington, Connecticut 06111. Either the strength or the bonding area of the adhesive material may be adjusted such that under the shock of a collision impact the adhesive bond of this type of sealant will be made to break and the platform freed for sliding movement of the main frame members 30—30 longitudinally of the vehicle. As for collision impacting the sides of the vehicle, an arrangement of tubes, clamps or anaerobic sealants, and energy absorbing material similarly to that disclosed herein but superimposed thereon and oriented at right angles thereto could furnish energy absorption and gradual deceleration of the occupant compartment should a severe sidewise directed collision occur.

In the event that automobile design or styling considerations make it advisable to provide different spacing between the tubular frame members 30—30 in the front and rear sections of the vehicle, a modified offset arrangement of the tubular sections illustrated in FIG. 14 could be adopted. In this example, the front sections of the tubular frame members are identified by their reference characters 30'—30'; the rear sections by the reference characters 30"—30". Their respective outer ends receive the push rods 38—38 and 42—42 of the front and rear bumpers and their respective inner end portions extend through the front and rear skirts 46 and abut a common transversely extending metal bar or beam 158 to which they are welded as shown at 160. Like the aforementioned ball stoppers 142, the transverse beam 158 is unattached to the platform 44 yet serves as a ball stopper and support for the offset sections of the tubular frame members. The beam 158 is provided with integrally joined cylindrical projections 162 on its opposite sides which enter and slidably fit the inner ends of the tube sections 30'—30' and 30"—30" for supporting the same. The transverse beam 158 should be designed with sufficient strength and rigidity to act as the ball stopper for each of the four tube sections welded thereto and to resist twisting forces it may encounter as well as to maintain the desired spacing of the four tube sections joined thereto.

When and as lighter weight batteries become available, if it should be deemed desirable for any reason to accept the penalty of extra vehicle weight and the complications of a four wheeled vehicle, it should be entirely feasible to adopt features of the herein disclosed embodiment to a four wheeled vehicle using either front or rear wheel drive by individual wheel motors, or the addition of a differential gear and "swing" axles for the wheels, or the tubular frame construction of FIG. 14 having two individual rear propulsion units such as shown in FIGS. 10 and 12 mounted on the sleeve elements 34, with the addition of suitable supports for the outboard pillow blocks 84 of the rocking shaft 78, and still incorporate the advantages of the tubular frame with telescoping bumpers and sliding occupant compartment, and any or all of the other elements contributing to the lightweight, energy efficient, safety vehicle disclosed herein.

CONCLUSION

As a result of this invention a low cost, light-weight, safe and highly efficient self-propelled vehicle has been developed which is especially adapted for deriving its operating power from a source of electrical energy carried by the vehicle and thus obviating the need for and dependence upon the use of petroleum based fuels. It is also apparent from the preceding description that a well integrated design of a basic vehicle has been proposed which is not only suitable for electric powered vehicles, and particularly those incorporating regenerative braking, but also for smaller lightweight vehicles powered by other means.

Further, it is apparent that the basic supporting structure of the vehicle disclosed herein unites the different parts of the vehicle into a coordinate whole. As pointed out early in the description of the illustrated embodiment, the vehicle's basic supporting structure is the pair of longitudinally extending, laterally spaced apart main frame members 30—30 each preferably of tubular cross-section and extending in this shape for substantially the length of the vehicle. Telescopingly interfitting with the front and rear end portions of these tubular members are supporting sleeves which carry the spring suspension systems for the front wheels 22—22 and the spring suspension system for the propulsion unit including the driving wheel 24 and motor 64 therefore. Moreover, because of their slidably fit on the tubular main frame members, the front and rear supporting sleeves 32—32 and 34—34, together with the assembly which each supports, can be conveniently slidably removed and later slidably re-attached or replaced with ease. Thus, a vehicle incorporating the present invention may be considered divisible into three separable major parts or unitary assemblies, the central occupant section 20, the front steerable wheel section 26 and the rear single driving wheel section 28, all carried on the two main frame members 30—30.

In addition, the tubular main frame members 30—30 assist in lessening the shock of collision impacts. The hollow interiors of these frame members, running for substantially the full length thereof, contain energy absorbing means preferably in the form of resilient spheres or balls 130 which are utilized for absorbing bumper shocks and jolts. By varying the resiliency of the ball mixture as earlier described herein, it is possible to devise a variety of smooth deceleration curves to choose from. Also, carried by the main frame members but externally thereof are energy absorbing devices which come into play upon occurence of a severe front or rear end collision and which enables the platform for the occupant compartment to slide on or otherwise move relative to the supporting main frame members in order to reduce the collision force to be absorbed by these devices. Aiding in this operation is a ball stopper 142 in each tubular main frame member which not only provides a relatively rigid medium against which the balls in the frame tube are compressed but externally of the frame tube the ball stopper forms a plate for compressing or crushing the energy absorbing material interposed between the plate and the opposing surface of the platform skirt.

The main frame tubes 30—30 also assist in the mounting of the rocking sub-frame 72 upon which the drive wheel 24 and the electric motor 64 are supported. As illustrated in FIGS. 8, 10–12, the sub-frame is welded or otherwise fixedly joined to a pivot shaft 78 which has its opposite extremities journaled in pillow blocks 84—84 which in turn are bolted to the undersides of rail sections 86—86 welded through gussets 87—87 to the sleeve portions 34—34 (FIG. 11) which removably slidably fit the main frame members 30—30. In this manner the rockable propulsion assembly is mounted as a unit between the rear sections of the vehicle's main frame members 30—30.

The elastomeric suspension systems for the road engaging wheels of the illustrated embodiment of the invention provide the desired "ride" characteristics without reliance on the flexibility in the tires for this purpose thus enabling the use of solid tires or tires of high pressure low rolling resistance types. Moreover, road wheels of larger diameter than conventional can be used to advantage; there are fewer rotations per unit distance traveled and less rolling resistance encountered.

While a particular embodiment of the invention has been shown and described and certain modifications discussed, it will be understood, of course, that it is not desired that the invention be limited thereto since other modifications may be made, and it is therefore comtemplated by the appended claims to cover any such modifications as fall within the true spirit and scope of the invention.

What is claimed is:

1. A light weight, energy efficient, safety motor vehicle including, in combination:

front and rear road engaging wheels at least one of which is power driven for moving the vehicle;
a pair of open ended tubularly shaped main frame members extending longitudinally of the vehicle in spaced apart generally parallel relation to one another and such that the front and rear sections of the frame members lie along side of and are supported by the road engaging wheels;
a front sub-frame connecting the front wheels into a unitary assembly and having sleeve means attachably and removably slidingly fitting the front end sections of the pair of main frame members for demountably securing the front wheels thereto;
at least one rear wheel mounted on a sub-frame having sleeve means attachably and removably slidingly fitting the rear end sections of the pair of main frame members for demountably securing the rear wheel or wheels thereto;
a vehicle bumper at the front end and at the rear end of the vehicle each having push rods slidably entering the front and rear terminating ends of the set of tubular main frame members;
at least one wall fixed transversely across a mid-portion of each of the main frame members to effectively divide the front sections from the rear sections;
energy absorbing means in the interior of the tubular main frame members being confined between the bumper push rods and the dividing wall to yieldingly resist external forces applied against either bumper in the direction of the vehicle; and
an occupant compartment of a size to contain at least the driver of the vehicle, said compartment being supported by the pair of tubular main frame members and mounted for a permitted restrained slidable movement on the frame members against energy absorbing means mounted on the exterior of the main frame members which yieldingly oppose shiftable movement of the compartment relative to the main frame members so as to cooperate in combination with the energy absorbing means in the interiors of the main frame members to control the change in momentum of the occupant compartment relative to the vehicle chassis in the event of collision.

2. The motor vehicle as set forth in claim 1 wherein the energy absorbing means in the interior of the tubular main frame member is composed, at least in part, of essentially crushable material.

3. The motor vehicle as set forth in claim 1 wherein the energy absorbing means in the interior of the tubular main frame members is composed, at least in part, of deformable material.

4. The motor vehicle as set forth in claim 1 wherein the energy absorbing means in the interior of the tubular main frame member is composed, at least in part, of hydraulic cylinders.

5. The motor vehicle as set forth in claim 1 wherein the energy absorbing means in the interior of the tubular main frame member is composed, at least in part, of pneumatic cylinders.

6. The motor vehicle as set forth in claim 1 wherein the energy absorbing means in the interior of the tubular main frame member is composed, at least in part, of devices extruding plastic material through an orifice.

7. The motor vehicle set forth in claim 1 wherein the driven road engaging wheels comprises at least two wheels in which the means for demountably attaching each driven wheel to the main frame members comprises a subframe disposed adjacent to the rear section of the main frame members and pivotally connected intermediate its ends to the rear sections of the main frame members for rocking motion about an axis extending transversely to the vehicle, each of said driven wheels being journaled to its sub-frame for rotation about an axis extending transversely to the vehicle and located to one side of the rocking axis of the sub-frame, a motor carried by each sub-frame on the side of the latter's rocking axis opposite to the driven wheel, and means operatively coupling each motor to its driven wheel for driving the same.

8. A light weight, energy efficient, safety motor vehicle including, in combination:

front and rear road engaging wheels at least one of which is power driven for moving the vehicle;
a pair of open ended tubularly shaped main frame members extending longitudinally of the vehicle in spaced apart generally parallel relation to one another and such that the front and rear sections of the frame members lie along side of and are supported by the road engaging wheels;

a front sub-frame connecting the front wheels into a unitary assembly and having sleeve means attachably and removably slidingly fitting the front end sections of the pair of main frame members for demountably securing the front wheels thereto;

at least one rear wheel mounted on a sub-frame having sleeve means attachably and removably slidingly fitting the rear end sections of the pair of main frame members for demountably securing the rear wheel or wheels thereto;

a vehicle bumper at the front end and at the rear end of the vehicle each having push rods slidably entering the front and rear terminating ends of the set of tubular main frame members;

at least one wall fixed transversely across a mid-portion of each of the main frame members to effectively divide the front sections from the rear sections;

energy absorbing means in the interior of the tubular main frame members being confined between the bumper push rods and the dividing walls to yieldingly resist external forces applied against either bumper in the direction of the vehicle;

said energy absorbing means in the interior of the tubular main frame members being composed of a plurality of compressible and expandable normally essentially spherically shaped elastomers arranged in substantially abutting relationship to one another to provide a resistance to progressive compression that increases with each increment of deformation caused by the inward movement of the push rods in the main frame members; and an occupant compartment of a size to contain at least the driver of the vehicle, said compartment being supported by the pair of tubular main frame members and mounted for a permitted restrained slidable movement on the frame members against energy absorbing means mounted on the exterior of the main frame members which yieldingly oppose shiftable movement of the compartment relative to the main frame members so as to cooperate in combination with the energy absorbing means in the interiors of the main frame members to control the change in momentum of the occupant compartment relative to the vehicle chassis in the event of collision.

9. The motor vehicle as set forth in claim 8 where the essentially spherical elastomers are of two or more materials having different energy absorbing characteristics thereby to provide for the adjustment of said resistance, and its rate of increase, by varying the number and mix of the elastomers.

10. The motor vehicle as set forth in claim 8 wherein the energy absorbing means in the interior of the tubular main frame members is composed of, at least in part, a plurality of compressible and expandable essentially spherical elastomers.

11. A light weight, energy efficient, safety motor vehicle including, in combination:
front and rear road engaging wheels at least one of which is power driven for moving the vehicle;
a pair of open ended tubularly shaped main frame members extending longitudinally of the vehicle in spaced apart generally parallel relation to one another and such that the front and rear sections of the frame members lie along side of and are supported by the road engaging wheels;

a front sub-frame connecting the front wheels into a unitary assembly and having sleeve means attachably and removably slidingly fitting the front end sections of the pair of main frame members for demountably securing the front wheels thereto;

at least one rear wheel mounted on a sub-frame having sleeve means attachably and removably slidingly fitting the rear end sections of the pair of main frame members for demountably securing the rear wheel or wheels thereto;

a vehicle bumper at the front end and at the rear end of the vehicle each having push rods slidably entering the front and rear terminating ends of the set of tubular main frame members;

at least one wall fixed transversely across a mid-portion of each of the main frame members to effectively divide the front sections from the rear sections;

energy absorbing means in the interior of the tubular main frame members being confined between the bumper push rods and the dividing wall to yieldingly resist external forces applied against either bum,per in the direction of the vehicle;

said power driven road engaging wheel being comprised of a single rear wheel together with its sub-frame assembly disposed centrally between the rear sections of the tubular main frame members and pivotally connected intermediate its ends to the rear sections of the main frame members for rocking motion about an axis extending transversely to the vehicle, said driven wheel being journaled to the sub-frame for rotation about an axis extending transversely to the vehicle and located to one side of the rocking axis of the sub-frame, a motor carried by the sub-frame on the side of the latter's rocking axis opposite to the driven wheel, and means operatively coupling the motor to the driven wheel for driving the same; and an occupant compartment of a size to contain at least the driver of the vehicle, said compartment being supported by the pair of tubular main frame members and mounted for a permitted restrained slidable movement on the frame members against energy absorbing means mounted on the exterior of the main frame members which yieldingly oppose shiftable movement of the compartment relative to the main frame members so as to cooperate in combination with the energy absorbing means in the interiors of the main frame members to control the change in momentum of the occupant compartment relative to the vehicle chassis in the event of collision.

12. A light weight, energy efficient, safety motor vehicle including, in combination:
front and rear road engaging wheels at least one of which is power driven for moving the vehicle;
a pair of open ended tubularly shaped main frame members extending longitudinally of the vehicle in spaced apart generally parallel relation to one another and such that the front and rear sections of the frame members lie along side of and are supported by the road engaging wheels;
a front sub-frame connecting the front wheels into a unitary assembly and having sleeve means attachably and removably slidingly fitting the front end sections of the pair of main frame members for demountably securing the front wheels thereto;

at least one rear wheel mounted on a sub-frame having sleeve means attachably and removably slidingly fitting the rear end sections of the pair of main frame members for demountably securing the rear wheel or wheels thereto;

a vehicle bumper at the front end and at the rear end of the vehicle each having push rods slidably entering the front and rear terminating ends of the set of tubular main frame members;

at least one wall fixed transversely across a mid-portion of each of the main frame members to effectively divide the front sections from the rear sections;

energy absorbing means in the interior of the tubular main frame members being confined between the bumper push rods and the dividing wall to yieldingly resist external forces applied against either bumper in the direction of the vehicle;

said power driven road engaging wheel being comprised of a single rear wheel together with its sub-frame assembly disposed centrally between the rear sections of the tubular main frame members and pivotally connected intermediate its ends to the rear sections of the main frame members for rocking motion about an axis extending transversely to the vehicle, said driven wheel being journaled to the sub-frame for rotation about an axis extending transversely to the vehicle and located to one side of the rocking axis of the sub-frame, a motor carried by the sub-frame on the side of the latter's rocking axis opposite to the driven wheel, and means operatively coupling the motor to the driven wheel for driving the same; and spring suspension means being formed by a plurality of resiliently stretchable and contractible endless shock rings looped on posts carried by the main frame and the sub-frame members for yieldingly holding the sub-frame in a position of equilibrium with respect to the main frame members in such a manner as to permit the use of hard, high pressure, low rolling resistance tires and still achieve a comfortable ride; and an occupant compartment of a size to contain at least the driver of the vehicle, said comaprtment being supported by the pair of tubular main frame members and mounted for a permitted restrained slidable movement on the frame members against energy absorbing means mounted on the exterior of the main frame members which yieldingly oppose shiftable movement of the compartment relative to the main frame members so as to cooperate in combination with the energy absorbing means in the interiors of the main frame members to control the change in momentum of the occupant compartment relative to the vehicle chassis in the event of collision.

13. The motor vehicle as set forth in claim 12 wherein the motor is a battery driven electric motor with a control system providing effective regenerative braking with improved energy recovery by utilization of the hard high pressure low rolling resistance tires means.

14. A motor vehicle including, in combination:

a front pair of steerable road engaging wheels and a single non-steerable road engaging rear driving wheel spaced from the front pair of wheels;

a pair of open ended tubularly-shaped main frame members extending longitudinally of the vehicle in spaced apart generally parallel relation to one another and such that the front end sections of the frame members extend between and lie along side of the pair of front steerable wheels and also such that the rear end sections of the frame members straddle the single drive wheel and lie along the outer sides thereof;

means demountably attaching the front pair of steerable wheels to the front end sections of the tubular main frame members, and means demountably attaching the single drive wheel to the rear end sections of the tubular main frame members;

a vehicle bumper at the front end and at the rear end of the vehicle each having push rods slidably entering the front and rear terminating ends of the pair of tubular main frame members;

a fixed stop located in the interior of each main frame member approximately midway of its length and effectively dividing the tubular interior of such frame member into forward and rearward portions thereof; and a separate series of compressible and expandable energy absorbing elements carried within the forward and rearward interior portions of each tubular main frame member and normally being confined between the fixed stop and the bumper push rod of each portion in uncompressed substantially contacting relationship, each said series of elements being capable of yieldingly resisting external forces applied against either bumper in the direction of the vehicle.

15. The motor vehicle as set forth in claim 14 wherein there is provided an occupant compartment of a size to contain at least the driver of the vehicle, said compartment being supported upon the mid-section of the set of tubular main frame members and mounted for a permitted restrained slidable movement on the frame members forwardly and rearwardly thereof.

16. The motor vehicle set forth in claim 15 wherein the compartment includes a platform straddling the midsection of the main frame members and resting thereon, and wherein elements are interposed between the platform and the main frame members which yieldingly oppose shiftable movement of the platform in either direction longitudinally of the vehicle but are compressible to permit such movement.

17. The motor vehicle as set forth in claim 14 in which the means for demountably attaching the single drive wheel to the main frame members comprises a sub-frame disposed between the rear sections of the main frame members and pivotally connected intermediate its ends to the rear sections of the main frame members for rocking motion about an axis extending transversely to the vehicle, said drive wheel being journaled to the sub-frame for rotation about an axis extending transversely to the vehicle and located to one side of the rocking axis of the sub-frame, a motor carried by the sub-frame on the side of the latter's rocking axis opposite to the drive wheel, and means operatively coupling the motor to the drive wheel for driving the same.

18. The motor vehicle set forth in claim 14 wherein the means for demountably attaching the front and rear wheels of the vehicle to the tubular main frame members include sleeve-like elements attachably and removably telescopingly embracing the frame members.

19. The motor vehicle set forth in claim 14 wherein the main frame members have the same inside diameter throughout their lengths and the elements therein are normally spherically shaped and have an outer diameter no greater than the inside diameter of the main frame members.

20. A motor vehicle including, in combination:
a front pair of steerable road engaging wheels and a single non-steerable road engaging rear driving wheel spaced from the front pair of wheels and centrally located with respect to the transverse dimension of the vehicle;
a pair of tube-shaped main frame members extending longitudinally of the vehicle in spaced parallel relation to one another and such that the front sections of the frame members lie between the pair of front steerable wheels and extend forwardly thereof to terminate therebeyond and further such that the rear sections of the frame members straddle the single drive wheel and extend rearwardly thereof to terminate therebeyond.

21. A motor vehicle including, in combination:
a front pair of steerable road engaging wheels and a single non-steerable road engaging rear driving wheel spaced from the front pair of wheels and centrally located with respect to the transverse dimension of the vehicle;
a pair of tube-shaped main frame members extending longitudinally of the vehicle in spaced parallel relation to one another and such that the front sections of the frame members lie between the pair of front steerable wheels and extend forwardly thereof to terminate therebeyond and further such that the rear sections of the frame members straddle the single drive wheel and extend rearwardly thereof to terminate therebeyond;
a front sub-frame connecting the pair of steerable wheels into a unitary assembly and having sleeve means attachably and removably slidable fitting the front end sections of the tube-shaped main frame members for demountably securing the pair of steerable wheels thereto;
a rear sub-frame disposed between the rear sections of the two sets of tube-shaped frame members and having means forming a pivotal mount for pivotally connecting an intermediate portion of the rear sub-frame to the rear sections of the frame members for rocking motion about an axis extending transversely to the vehicle, said single drive wheel being journaled to the rear sub-frame for rotation about an axis likewise extending transversely to the vehicle and located on one side of the pivotal connection of the sub-frame to the frame members, a motor carried by the rear sub-frame in a counterbalancing relation to the single drive wheel and located on the side of the rocking axis of the sub-frame opposite to the drive wheel, and means operatively coupling the motor to the drive wheel for driving the same;
sleeve means carried by the pivotal mount for the rear sub-frame for attachably and removably slidably fitting the rear sections of the tube-shaped frame members for demountably securing the single drive wheel and its driving motor to the rear sections of the tube-shaped main frame members; and
a bumper being provided at each end of the vehicle having push rods slidably entering the front and rear terminating ends of the pair of main frame members, and a plurality of compressible and expandible balls carried within each tubular main frame member and being confined by the bumper push rods in an uncompressed but substantially contacting relationship with one another, said balls being operable to compressibly engage one another and thereby yieldingly resisting external forces applied against either bumper in the direction of the vehicle, a wall fixed transversely across midportion of each of the pairs of main frame members to serve as a stop against which the balls in each frame member are compressed when bumper shocks in the direction of the vehicle are encountered.

22. A motor vehicle including, in combination:
a front pair of steerable road engaging wheels and a single non-steerable road engaging rear driving wheel spaced from the front pair of wheels and centrally located with respect to the transverse dimension of the vehicle;
a pair of tube-shaped main frame members extending longitudinally of the vehicle in spaced parallel relation to one another and such that the front sections of the frame members lie between the pair of front steerable wheels and extend forwardly thereof to terminate therebeyond and further such that the rear sections of the frame members straddle the single drive wheel and extend rearwardly thereof to terminate therebeyond;
a front sub-frame connecting the pair of steerable wheels into a unitary assembly and having sleeve means attachably and removably slidable fitting the front end sections of the tube-shaped main frame members for demountably securing the pair of steerable wheels thereto;
a rear sub-frame disposed between the rear sections of the two sets of tube-shaped frame members and having means forming a pivotal mount for pivotally connecting an intermediate portion of the rear sub-frame to the rear sections of the frame members for rocking motion about an axis extending transversely to the vehicle, said single drive wheel being journaled to the rear sub-frame for rotation about an axis likewise extending transversely to the vehicle and located on one side of the pivotal connection of the sub-frame to the frame members, a motor carried by the rear sub-frame in a counterbalancing relation to the single drive wheel and located on the side of the rocking axis of the sub-frame opposite to the drive wheel, and means operatively coupling the motor to the drive wheel for driving the same;
sleeve means carried by the pivotal mount for the rear sub-frame for attachably and removably slidably fitting the rear sections of the tube-shaped frame members for demountably securing the single drive wheel and its driving motor to the rear sections of the tube-shaped main frame members; and
a spring suspension system being associated with at least one of said sub-frames and including three posts arranged in a row extending longitudinally of the vehicle further including two sets of resiliently stretchable and contractible endless shock rings acting in opposition to one another, one of the shock ring sets being looped around the center post and one of the two outer posts while the other shock ring set is looped around the center post and the remaining outer post, the central one of the three posts being secured to the sub-frame of the wheel with which it is associated and rocking in fixed relation therewith as the wheel rises and falls relative to the main frame members, and the two remaining posts being rigidly secured effectively to the adjacent main frame member of said pair of main frame members, with the result that one of the sets of shock rings cushions the road wheels to absorb both the weight of the vehicle and the road reaction forces in the upward direction and the other set of shock rings opposes movement of the road wheels in the downward direction.

23. A motor vehicle including, in combination:
a front pair of steerable road engaging wheels and at least one non-steerable road engaging rear wheel spaced from the front pair of wheels, at least one of the wheels being powered to drive the vehicle;
a pair of open ended tubularly-shaped main frame members supported by the road wheels and extending longitudinally of the vehicle in spaced apart generally parallel relation to one another such that the front sections of the frame members lie adjacent to the pair of front steerable wheels and such that the rear sections of the frame members lie adjacent to said at least one rear wheel;
a vehicle bumper at the front end and at the rear end of the vehicle each having push rods entering the front and rear terminating ends of the pair of tubular main frame members and movable varying distances thereinto depending upon the magnitude of the impact suffered by its bumper;
a series of energy absorbing elements carried within each tubular main frame member and normally in uncompressed substantially contacting relationship with one another, said series of elements responding to inward thrusts of the bumper push rods caused by forces applied against either bumper in the direction of the vehicle by compressively engaging one another with increasing resistance the further the push rods are advanced into the tubular main frame members; and
means demountably attaching each said drive wheel to the main frame members which comprises a sub-frame spring suspension means connected between the sub-frame and the main frame members yieldingly holding the sub-frame in a position of equilibrium with respect to the main frame members, said spring suspension means being formed by a plurality of resiliently stretchable and contractible endless shock rings looped around posts carried by the subframe and the main frame members.

24. The motor vehicle as set forth in claim 23 further including an occupant compartment of a size to contain at least the driver of the vehicle, said compartment being supported upon the mid-sections of the pair of tubular main frame members and mounted for a permitted restrained slidable movement on the frame members forwardly and rearwardly thereof.

25. The motor vehicle set forth in claim 24 wherein the compartment includes a platform straddling the mid-section of the main frame members and resting thereon, and wherein energy absorbing elements are interposed between the platform and the main frame members which yieldingly oppose shiftable movement of the platform in either direction longitudinally of the vehicle but are compressible to permit such movement.

26. The motor vehicle set forth in claim 23 wherein the means demountably attaching the front and rear wheels of the vehicle to the tubular main frame members further include sleeve-like elements slidably telescopingly embracing the frame members.

27. A motor vehicle including, in combination:
a front pair of steerable road engaging wheels and at least one non-steerable road engaging rear wheel spaced from the front pair of wheels, at least one of the wheels being powered to drive the vehicle;
a pair of open ended tubularly-shaped main frame members supported by the road wheels and extending longitudinally of the vehicle in spaced apart generally parallel relation to one another such that the front sections of the frame members lie adjacent to the pair of front steerable wheels and such that the rear sections of the frame members lie adajcent to said at least one rear wheel;
a vehicle bumper at the front end and at the read end of the vehicle each having push rods entering the front and rear terminating ends of the pair of tubular main frame members and movable varying distances thereinto depending upon the magnitude of the impact suffered by its bumper;
a series of energy absorbing elements carried within each tubular main frame member and normally in uncompressed substantially contacting relationship with one another, said series of elements responding to inward thrusts of the bumper push rods caused by forces applied against either bumper in the direction of the vehicle by compressively engaging one another with increasing resistance the further the push rods are advanced into the tubular main frame members; and
a wall fixed transversely across a mid-portion of each main frame member to serve as a stop against which the energy absorbing elements in each frame member are compressed when bumper shocks are encountered.

28. A motor vehicle including, in combination:
a front pair of steerable road engaging wheels and at least one non-steerable road engaging rear wheel spaced from the front pair of wheels, at least one of the wheels being powered to drive the vehicle;
a pair of open ended tubularly-shaped main frame members supported by the road wheels and extending longitudinally of the vehicle in spaced apart generally parallel relation to one another such that the front sections of the frame members lie adjacent to the pair of front steerable wheels and such that the rear sections of the frame members lie adjacent to said at least one rear wheel;
a vehicle bumper at the front end and at the rear end of the vehicle each having push rods entering the front and rear terminating ends of the pair of tubular main frame members and movable varying distances thereinto depending upon the magnitude of the impact suffered by its bumper;
a series of energy absorbing elements carried within each tubular main frame member and normally in uncompressed substantially contacting relationship with one another, said series of elements responding to inward thrusts of the bumper push rods caused by forces applied against either bumper in the direction of the vehicle by compressively engaging one another with increasing resistance the further the push rods are advanced into the tubular main frame members; and a wall fixed transversely across a mid-portion of each main frame member to serve as a stop against which the energy absorbing elements in each frame member are compressed when bumper shocks are encountered, said main frame members having the same inside diameter throughout their lengths and the elements carried therewithin are normally sphericaly shaped and have an outer diameter no greater than the inside diameter of the main frame members.

29. In a motor vehicle, a suspension system connecting a wheel to the main frame chassis structure comprising a wheel axle, a lever connecting the wheel axle to a point of rotation on the main frame chassis, said lever rocking about said point of rotation in fixed relationship to the upward and downward movement of the wheel as it engages irregularities in the road, a post rigidly connected to said lever so as to rock about said point of rotation in fixed relationship with said wheel and lever, one or more additional posts stationarily secured to the main frame chassis structure, said rocking post and said one or more stationary posts being joined by meams comprising one or more resiliently stretchable and contractible elastomeric units acting in tension to cushion the road wheel to absorb both the weight of the vehicle at said point of rotation and road reaction forces, and means providing bodily adjustment of said stationary posts to vary their distance from the axis of said point of rotation.

30. A road vehicle including, in combination:
    front and rear road engaging wheels;
    a like pair of open ended round tubularly shaped main frame members supported by the road wheels and extending longitudinally of the vehicle beyond the axles of the front and rear wheels and in a spaced apart generally parallel relation to each other;
    a vehicle bumper at the front end and at the rear end of the vehicle each having push rods slidably entering the front and rear terminating ends of the pair of tubular main frame members;
    energy absorbing means in the interior of the tubular main frame members;
    means to restrain movement of the energy absorbing means;
    said energy absorbing means being confined between the bumper push rods and the restraining means to yieldingly resist external forces applied against either bumper in the direction of the vehicle; and
    said energy absorbing means in the interior of the tubular main frame members being comprised of a plurality of compressible and expandable normally essentially spherical elastomers arranged in substantially abutting relationship to one another to provide a resistance to progressive compression that increases with each increment of deformation caused by the inward thrust of the push rods into the main frame members.

31. The road vehicle as set forth in claim 30, wherein the essentially spherical elastomers comprise first and second types, each type of a different material and having different resistances to compression and different energy absorbing characteristics thereby to provide for the adjustment of said resistance, and the rate of increase, by varying the number and mix of the different types of the spherical elastomers.

32. The road vehicle as set forth in claim 30, wherein the means for attaching each of said road engaging wheels to the main frame members comprises a sub-frame spring suspension means formed by a plurality of resiliently stretchable and contractable endless shock rings looped around spaced posts carried by the main frame members and the sub-frame members to yieldingly hold the sub-frame in a position of equilibrium with respect to the main frame members in such a manner as to permit the use of hard, high-pressure, low rolling resistance tires and still achieve a comfortable ride.

33. The road vehicle as set forth in claim 32 wherein means is provided for adjustably varying the spacing of the posts.

34. The road vehicle as set forth in claim 30 wherein the energy absorbing means in the interior of the tubular main frame members is composed, in part, of a plurality of compressible and expandable essentially spherical elastomers and in part of other means to absorb energy in order to permit a widely varying adjustment of the characteristics of the reacting force to a bumper impact.

35. A road motor vehicle including in combination:
    a front pair of steerable road engaging wheels and at least one non-steerable road engaging rear wheel spaced from the front pair of wheels, at least one of the wheels being powered to drive the vehicle;
    a pair of open ended tubularly-shaped main frame members supported by the road wheels and extending longitudinally of the vehicle in spaced apart generally parallel relation to one another such that the front sections of the frame members lie adjacent to the pair of front steerable wheels and such that the rear sections of the frame members lie adjacent to said at least one rear wheel;
    a vehicle bumper at the front end and at the rear end of the vehicle each having push rods entering the front and rear terminating ends of the pair of tubular main frame members and movable varying distances thereinto depending upon the magnitude of the impact suffered by its bumper; and
    a series of energy absorbing elements carried within each tubular main frame member and normally in uncompressed substantially contacting relationship with one another, said series of elements responding to inward thrusts of the bumper push rods caused by forces applied against either bumper in the direction of the vehicle by compressively engaging one another with increasing resistance the further the push rods are advanced into the tubular main frame members.

36. A road motor vehicle including, in combination:
    a front pair of steerable road engaging wheels and a single non-steerable road engaging rear driving wheel spaced from the front pair of wheels; and a motor for driving the single rear wheel;
    a pair of main frame members extending longitudinally of the vehicle in spaced apart generally parallel relationship to one another and such that the front sections of the frame members lie between the pair of front steerable wheels and further such that the rear sections of the frame members straddle the single drive wheel;
    means mounting the front pair of steerable wheels as a unitary assembly on the front sections of the main frame members, and means mounting the single drive wheel and its motor as a unitary assembly on the rear sections of the main frame members;
    said last means including a sub-frame disposed between the rear sections of the main frame members and pivotally connected intermediate its ends to the rear sections of the main frame members for rocking motion about an axis extending transverse to the vehicle, said drive wheel being journaled to the sub-frame for rotation about an axis likewise extending transverse to the vehicle and located on one side of the pivotal connection of the sub-frame to the main frame members, and said motor being carried by the sub-frame on the side of said pivotal connection opposite to the drive wheel and being operatively coupled to the drive wheel for driving the same.

37. A motor vehicle as set forth in claim 1 wherein the inner ends of the front section and the rear section of each tubularly-shaped main frame member terminate approximately midway of the length of the vehicle but in axially offset relation to one another, and further wherein the fixed stop of each main frame member is replaced by a rigid beam extending transversely of the vehicle and firmly connected to the inner ends of the front and rear sections of the main frame members to serve as a common stop therefor.

* * * * *

UNITED STATES PATENT OFFICE
CERTIFICATE OF CORRECTION

Patent No. 4,171,730    Dated October 23, 1979

Inventor(s) DOUGLAS DOW

It is certified that error appears in the above-identified patent and that said Letters Patent are hereby corrected as shown below:

In column 18, line 26 (Claim 11), delete "bum,per" and insert --bumper--.

In column 19, line 47 (Claim 12), delete "comaprtment" and insert --compartment--.

In column 21, line 21 (Claim 20), change the period at the end of the sentence to a semi-colon, and insert
--a front sub-frame connecting the pair of steerable wheels into a unitary assembly and having sleeve means attachably and removably slidable fitting the front end sections of the tube-shaped main frame members for demountably securing the pair of steerable wheels thereto;
a rear sub-frame disposed between the rear sections of the two sets of tube-shaped frame members and having means forming a pivotal mount for pivotally connecting an intermediate portion of the rear sub-frame to the rear sections of the frame members for rocking motion about an axis extending transversely to the vehicle, said single drive wheel being journaled to the rear sub-frame for rotation about an axis likewise extending transversely to the vehicle and located on one side of the pivotal connection of the sub-frame to the frame members, a motor carried by the rear sub-frame in a counterbalancing relation to the single drive wheel and located on the side of the rocking axis of the sub-frame opposite to the drive wheel, and means operatively coupling the motor to the drive wheel for driving the same; and
sleeve means carried by the pivotal mount for the rear

UNITED STATES PATENT OFFICE
CERTIFICATE OF CORRECTION

Patent No. 4,171,730      Dated October 23, 1979

Inventor(s) DOUGLAS DOW

It is certified that error appears in the above-identified patent and that said Letters Patent are hereby corrected as shown below:

>sub-frame for attachably and removably slidably fitting the rear sections of the tube-shaped frame members for demountably securing the single drive wheel and its driving motor to the rear sections of the tube-shaped main frame members.--

In column 24, line 19 (Claim 27), delete "read" and insert --rear--.

In column 25, line 8 (Claim 28), delete "sphericaly" and insert --spherically--.

Signed and Sealed this

Twenty-ninth Day of July 1980

[SEAL]

Attest:

SIDNEY A. DIAMOND

Attesting Officer     Commissioner of Patents and Trademarks